(12) United States Patent
Lutz

(10) Patent No.: US 11,592,213 B2
(45) Date of Patent: Feb. 28, 2023

(54) REFRIGERATION SYSTEM WITH HEAT RECOVERY

(71) Applicant: Carrier Corporation, Palm Beach Gardens, FL (US)

(72) Inventor: Geoffrey Lutz, Montluel (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 195 days.

(21) Appl. No.: 16/869,768

(22) Filed: May 8, 2020

(65) Prior Publication Data

US 2020/0355381 A1 Nov. 12, 2020

(30) Foreign Application Priority Data

May 9, 2019 (EP) .................................... 19305587

(51) Int. Cl.
*F25D 17/00* (2006.01)
*F25B 6/04* (2006.01)
(Continued)

(52) U.S. Cl.
CPC ............ *F25B 6/04* (2013.01); *F24D 17/0005* (2013.01); *F24F 5/0096* (2013.01); *F25B 27/02* (2013.01);
(Continued)

(58) Field of Classification Search
CPC ... F24F 5/0096; F24F 2221/183; F25B 27/02; F25B 2500/31; F24D 17/0005; F24D 2200/31
See application file for complete search history.

(56) References Cited

U.S. PATENT DOCUMENTS

| 2011/0036113 | A1* | 2/2011 | Kopko | ................... | F25B 30/02 |
| | | | | | 62/324.5 |
| 2015/0345846 | A1* | 12/2015 | Kopko | ................... | F25B 49/02 |
| | | | | | 62/115 |
| 2018/0361828 | A1* | 12/2018 | Kato | ..................... | B60H 1/321 |

FOREIGN PATENT DOCUMENTS

| CN | 102384586 A | * | 3/2012 |
| DE | 3512748 A1 | * | 10/1986 |

(Continued)

OTHER PUBLICATIONS

Zeshao, Parallel Connection Type Mutually Helped Defrosting Water Heater of Air Source Heat Pump, Mar. 21, 2012, CN102384586A, Whole Document (Year: 2012).*

(Continued)

*Primary Examiner* — Larry L Furdge
(74) *Attorney, Agent, or Firm* — Cantor Colburn LLP

(57) ABSTRACT

A refrigeration system includes at least one refrigeration circuit 2. The refrigeration circuit 2 includes a compressor 10, a first heat rejecting heat exchanger 6, a second heat rejecting heat exchanger 8, an expansion valve 12 and a heat absorbing heat exchanger 4. The refrigeration circuit 2 further includes a heat recovery control valve 14 for controlling flow of the compressed refrigerant fluid between the first heat rejecting heat exchanger and the second heat rejecting heat exchanger. The first heat rejecting heat exchanger 6 is for receiving compressed refrigerant fluid from the compressor 10 and exchanging heat between the compressed refrigerant fluid and a second fluid to increase the temperature of the second fluid. The second heat rejecting heat exchanger 8 is for receiving the compressed refrigerant fluid and exchanging heat with ambient air to cool the compressed refrigerant fluid.

10 Claims, 2 Drawing Sheets

(51) Int. Cl.
   *F24D 17/00* (2022.01)
   *F24F 5/00* (2006.01)
   *F25B 27/02* (2006.01)
   *F25B 41/20* (2021.01)
   *F25B 41/39* (2021.01)

(52) U.S. Cl.
   CPC .............. *F25B 41/20* (2021.01); *F25B 41/39* (2021.01); *F24D 2200/31* (2013.01); *F24F 2221/183* (2013.01); *F25B 2500/31* (2013.01)

(56) References Cited

FOREIGN PATENT DOCUMENTS

| | | |
|---|---|---|
| DE | 102015003546 A1 | 8/2015 |
| DE | 112016005644 T5 | 8/2018 |

OTHER PUBLICATIONS

Hakemann, Device for the Connection of a Refrigeration Unit to a Heat Recovery Installation, Oct. 19, 1986, DE3512748A1,Whole Document (Year: 1986).*

European Search Report for application EP 19305587.8, dated Oct. 17, 2019, 7 pages.

* cited by examiner

REFRIGERATION SYSTEM WITH HEAT RECOVERY

FOREIGN PRIORITY

This application claims priority to European Patent Application No. 19305587.8, filed May 9, 2019, and all the benefits accruing therefrom under 35 U.S.C. § 119, the contents of which in its entirety are herein incorporated by reference.

BACKGROUND

The present invention relates to a refrigeration system using a refrigeration circuit including a refrigerant fluid, as well as to a method for control of such a refrigerant system.

It is known to use a refrigeration system for cooling, such as for providing cooling to a temperature controlled space within a building. Such a refrigeration system includes a refrigeration circuit for circulation of a refrigerant fluid that undergoes a refrigeration cycle with compression, expansion and heat exchange. The refrigeration circuit includes a heat absorbing heat exchanger (e.g. an evaporator inside the building) for supplying cooling, and a heat rejecting heat exchanger (e.g. a condenser outside the building) allowing unwanted heat to be rejected to the atmosphere, i.e. to air at ambient temperature.

In some prior art arrangements the heat rejecting heat exchanger is arranged for heat exchange between compressed refrigerant fluid and ambient air, such as air outside a building, with heat hence being rejected directly to the outside air by increasing the temperature of the air and then typically by forcing the heated air away from the heat exchanger, such as via a fan, to allow more air at ambient temperature to take its place. The heat absorbing heat exchanger receives the refrigerant fluid after expansion and may absorb heat from air or water within the building, with the cooled air or water being used to cool the building. The required cooling of the building can be achieved by cooling air and distributing the cooled air, or it may be done by cooling water and distributing the cooled water for later heat exchange to cool air, such as via a fan coil unit, where a coil for the cooled water is used to exchange heat with air passing over the coil.

SUMMARY

It has been proposed to enhance the overall efficiency of this type of refrigeration system by the addition of heat recovery to take heat from the compressed refrigerant fluid before heat is rejected to the atmosphere. It is often the case that there is a demand for heat even in situations where the primary purpose of the refrigeration system is to provide cooling. For example, in the case of cooling air within a building there may also be a demand for hot water. Thus, in some cases the basic refrigeration circuit is enhanced by the addition of a heat recovery heat exchanger, which can be a heat rejecting heat exchanger placed prior to the rejection of heat to the atmosphere. This can be used for heat exchange to increase the temperature of water and decrease the temperature of the compressed refrigerant, allowing for the heat to be used as required and increasing the efficiency of the system by reducing the amount of energy lost via rejection of heat to the atmosphere.

Viewed from a first aspect, the invention provides a refrigeration system including at least one refrigeration circuit, the refrigeration circuit comprising: a compressor for compressing a refrigerant fluid in the refrigeration circuit; a first heat rejecting heat exchanger for receiving the compressed refrigerant fluid and exchanging heat between the compressed refrigerant fluid and a second fluid to increase the temperature of the second fluid; a second heat rejecting heat exchanger for receiving the compressed refrigerant fluid and exchanging heat with ambient air to cool the compressed refrigerant fluid; an expansion valve for expansion of the refrigerant fluid; and a heat absorbing heat exchanger for heat exchange between the expanded refrigerant fluid and a third fluid to decrease the temperature of the third fluid; wherein the refrigeration circuit further includes a heat recovery control valve for controlling flow of the compressed refrigerant fluid between the first heat rejecting heat exchanger and the second heat rejecting heat exchanger, with the valve having a variable opening and the refrigeration system being arranged to control the size of the variable opening based on at least one of the temperature of the ambient air and the temperature of the second fluid after heat exchange with the refrigerant fluid.

It will be appreciated that this refrigeration system can be used for cooling of a temperature controlled space with the addition of heat recovery to enhance overall efficiency as with the prior art systems discussed above. Thus, the first heat rejecting heat exchanger may be described as a heat recovery heat exchanger. The refrigeration system of the first aspect includes a heat recovery control valve to control flow of the compressed refrigerant fluid between the first heat rejecting heat exchanger and the second heat rejecting heat exchanger, which may allow for further enhancement of efficiency as discussed in more detail below with reference to an example embodiment. In brief, the valve can be used to increase pressure at the first heat rejecting heat exchanger and reduce flow through the first and second heat rejecting heat exchangers. This allows for improved control of the circuit to maximise heat transfer to the second fluid, whilst also ensuring adequate heat rejection to the ambient air, and hence increasing the heat recovery performance of the system. The inventors have realised that in the prior art system described above there may be inefficiencies and/or inadequate performance for heat recovery when the outside air temperature is relatively low, i.e. the difference in temperature between the outside air and inside air is relatively high, and that there are possibilities for a greater degree of heat recovery in such situations, with potential gains in efficiency via the use of the valve as described herein.

The second fluid may be water with the first heat rejecting heat exchanger thus being used to heat the water. Since the refrigeration system may be used for applications such as for cooling of a building with heat recovery, then this arrangement can allow for supply of hot water for the building, or for other purposes. The third fluid may be air, i.e. for a relatively direct cooling of a temperature controlled space such as in a building, or it may be a liquid such as water, allowing for distribution of the cooled liquid for later heat transfer with air, such as via a fan coil unit.

The heat recovery control valve has a variable opening with the size of the variable opening being controlled based on at least one of the temperature of the ambient air and the temperature of the second fluid after heat exchange with the refrigerant fluid, and optionally being controlled with reference to both of the temperature of the ambient air and the temperature of the second fluid, such as with control logic involving both temperature values as inputs. In some examples the opening of the heat recovery control valve is controlled to ensure a required set-point temperature for the second fluid, i.e. a required minimum temperature for the second fluid after heating in the first heat rejecting heat exchanger. Thus, the degree of opening of the heat recovery control valve may be reduced if the temperature of the second fluid is below the set-point temperature. Alternatively or additionally the opening of the heat recovery control valve may be controlled to increase heat recovery dependent on the temperature of the ambient air, i.e. the temperature of the air that is outside of the temperature controlled space. Thus, the degree of opening of the heat recovery control valve may be reduced if the ambient air temperature is below a threshold and/or if the difference in temperature between the ambient air and the temperature of the air inside the temperature controlled space exceeds a threshold.

In some examples, the control of the heat recovery control valve allows for a time limit after activation of a heat recovery mode. For instance, if the temperature setpoint for the second fluid is not reached with a time period (for example a time in the range 2-10 minutes, such as 5 minutes) after the activation of a heat recovery mode, then the heat recovery control valve can be closed progressively up to a maximum closing degree (for example 90%). Similarly, if the temperature of the second fluid drops below the temperature setpoint then the heat recovery control valve may be closed, optionally after allowing a time period (for example a time in the range 2-10 minutes, such as 5 minutes) to cover for acceptable fluctuations in temperature. Whilst the valve opening is closed then if the temperature setpoint is reached then the valve may be opened progressively.

The refrigeration system may be arranged to control the size of the variable opening only if the temperature of the refrigerant fluid leaving the first heat rejecting heat exchanger is in excess of a threshold value. This threshold value may be variable depending on the outside air temperature, and in some examples may vary in proportion with outside air temperature when the outside air temperature is above a set value. For example, when the outside air temperature is below the set value, such as 15° C., then closing of the variable opening of the heat recovery control valve may be permitted if the temperature of the refrigerant fluid leaving the first heat rejecting heat exchanger is in excess of a set value, such as 20° C. Alternatively or additionally, when the outside air temperature is above the set value, such as 15° C., then closing of the variable opening of the heat recovery control valve may be permitted if the temperature of the refrigerant fluid leaving the first heat rejecting heat exchanger is in excess of a variable value set by a calculation based on the outside air temperature, such as being in excess of A+B×outside air temperature, where A and B are constants. In one possible set-up A=5° C. and B=1.

The heat recovery control valve may be a motorised valve of any suitable type. As the valve is used for control of the flow in the refrigeration circuit rather than to prevent flow/ shut off a part of the circuit then when it should not be fully closed. The valve may have a structure that prevents full closure of the valve and/or may be designed without the possibility to fully close the valve. Thus the variable opening of the heat recovery control valve may be variable between fully open and partially closed, with no possibility to further close beyond a minimum degree of opening. By way of an example, the minimum degree of opening may be 10% of the valve opening, i.e. a 90% closure of the valve.

A controller may be provided as a part of the refrigeration system in order to provide the required control of the heat recovery control valve. This controller may also control other elements within the refrigeration circuit, such as the compressor. The controller may receive temperature measurements from sensors, such as a sensor for ambient air temperature (outside air temperature), a sensor for temperature of the temperature controlled space, and/or sensors within with refrigeration circuit such as for measuring temperatures and/or pressures. The sensors may be comprised as a part of the refrigeration system.

The expansion valve may be arranged to provide a controllable degree of opening and may for example be an electronic expansion valve. The degree of opening of the expansion valve may be controlled to compensate for changes in the behaviour of the refrigerant circuit depending on the degree of opening of the heat recovery control valve. In an example arrangement, to compensate for a pressure drop generated by the closing of the heat recovery control valve, the expansion valve will increase its opening in order to keep the same behaviour of the refrigerant circuit, for example the opening of the expansion valve may be controlled in order to keep the same refrigerant mass flow through the circuit. The expansion valve may be controlled by the same controller as the heat recovery control valve.

The refrigeration system may include further fluid circuits for the second fluid and/or the third fluid, such as a second fluid circuit for flow of the second fluid (e.g. water to be heated) and heat exchange with the first heat recovery heat exchanger and/or a third fluid circuit for flow of the third fluid (e.g. water to be cooled) and heat exchange with the heat absorbing heat exchanger. The refrigeration system may include the second fluid within the second fluid circuit and/or may include the third fluid within the third fluid circuit. The heat absorbing heat exchanger may be an evaporator of any suitable design. The first and second heat rejection heat exchangers may together act a condenser. Typically the first heat rejection heat exchanger may transfer heat to the second fluid without condensation, and therefore in the case of a liquid as the second fluid this heat exchanger may be a gas-liquid heat exchanger of any suitable design. The first heat rejection heat exchanger may be a brazed plate heat exchanger. The second heat rejection heat exchanger may primarily act as a condenser for condensation of the refrigerant fluid via heat rejection to the ambient air and for completing cooling of the refrigerant fluid to a ambient temperatures.

The refrigeration circuit may also include an economiser line. In the case of an economiser line there may be a branch in the refrigeration circuit with a branch point after the second heat rejection heat exchanger and prior to the expansion valve, with an economiser line extending from the branch point to an economiser inlet port of the compressor and a main line of the refrigerant circuit extending from the branch point, through the economiser valve and the heat absorbing heat exchanger, to a main, suction, inlet of the compressor. There may be an economiser valve in the economiser line for economised expansion and for control of the degree of economiser flow, as well as an economiser heat exchanger for heat exchange between refrigerant fluid in the economiser line after the economiser valve and refrigerant fluid in the main line after the branch point and prior to the expansion valve. The economiser heat exchanger may be a brazed plate heat exchanger.

It will be appreciated that this economiser line may be used in a similar way to known economiser lines, with control of the economiser valve for enhanced operation as is known for economised systems. With the use of the heat recovery control valve in the presently proposed arrangement the control of the economiser valve may be adjusted to compensate for the effect of closing the heat recovery control valve. This may be done in conjunction with control of the expansion valve as discussed above.

The refrigeration circuit may be a first refrigeration circuit of the refrigeration system, which may further include a second refrigeration circuit. The second refrigeration circuit advantageously includes the same features as the first refrigeration circuit, and may be identical thereto.

The first and second refrigeration circuits may be connected in parallel or in series for heat exchange with the second fluid to heat the second fluid and/or for heat exchange with the third fluid to cool the third fluid. In one example arrangement the first and second refrigeration circuits are connected in parallel for heat exchange with the second fluid to heat the second fluid and connected in parallel for heat exchange with the third fluid to cool the third fluid. The heat absorbing heat exchangers of the first and second refrigeration circuits may form parts of a common heat absorbing heat exchanger. With the use of two refrigeration circuits the two heat recovery control valves may be controlled together by a single controller, and thus there may be a single controller for controlling both of the two circuits, including control of the degree of opening of the heat recovery control valve as well as control of other elements, such as the other valves and/or the compressors.

Viewed from a second aspect, the invention provides a method for control of a refrigeration system as described above, i.e. a refrigeration system as in the first aspect and optionally including other features as discussed above. The method comprises operating the compressor to circulate the refrigerant fluid around the refrigerant circuit and controlling the size of the variable opening based on at least one of the temperature of the ambient air and the temperature of the second fluid after heat exchange with the refrigerant fluid.

The size of the variable opening may be controlled with reference to both of the temperature of the ambient air and the temperature of the second fluid, and the method may include the use of control logic involving both temperature values as inputs. In some examples method includes controlling the opening of the heat recovery control valve to ensure a required set-point temperature for the second fluid, i.e. a required minimum temperature. Thus, the degree of opening of the heat recovery control valve may be reduced if the temperature of the second fluid is below the set-point temperature. Alternatively or additionally the method may include controlling the opening of the heat recovery control valve to increase heat recovery dependent on the temperature of the ambient air, i.e. the temperature of the air that is outside of the temperature controlled space. Thus, the degree of opening of the heat recovery control valve may be reduced if the ambient air temperature is below a threshold and/or if the difference in temperature between the ambient air and the temperature of the air inside the temperature controlled space exceeds a threshold.

The method may include using temperature measurements from sensors, such as a sensor for ambient air temperature (outside air temperature), a sensor for temperature of the temperature controlled space, and/or sensors within with refrigeration circuit such as for measuring temperatures and/or pressures. The sensors may be comprised as a part of the refrigeration system.

The method may also include controlling a degree of opening of expansion valve, which may be an electronic expansion valve. The method may include controlling the degree of opening of the expansion valve to compensate for changes in the behaviour of the refrigerant circuit depending on the degree of opening of the heat recovery control valve.

The method may include using further fluid circuits for circulation of the second fluid and/or the third fluid. The method may include using an economiser line, optionally with control of an economiser valve including adjusting the degree of opening of the economiser valve to compensate for the effect of closing the heat recovery control valve. This may be done in conjunction with control of the expansion valve as discussed above.

DRAWING DESCRIPTION

Certain example embodiments will now be described by way of example only and with reference to the accompanying drawings, in which.

DETAILED DESCRIPTION

Figure 1:
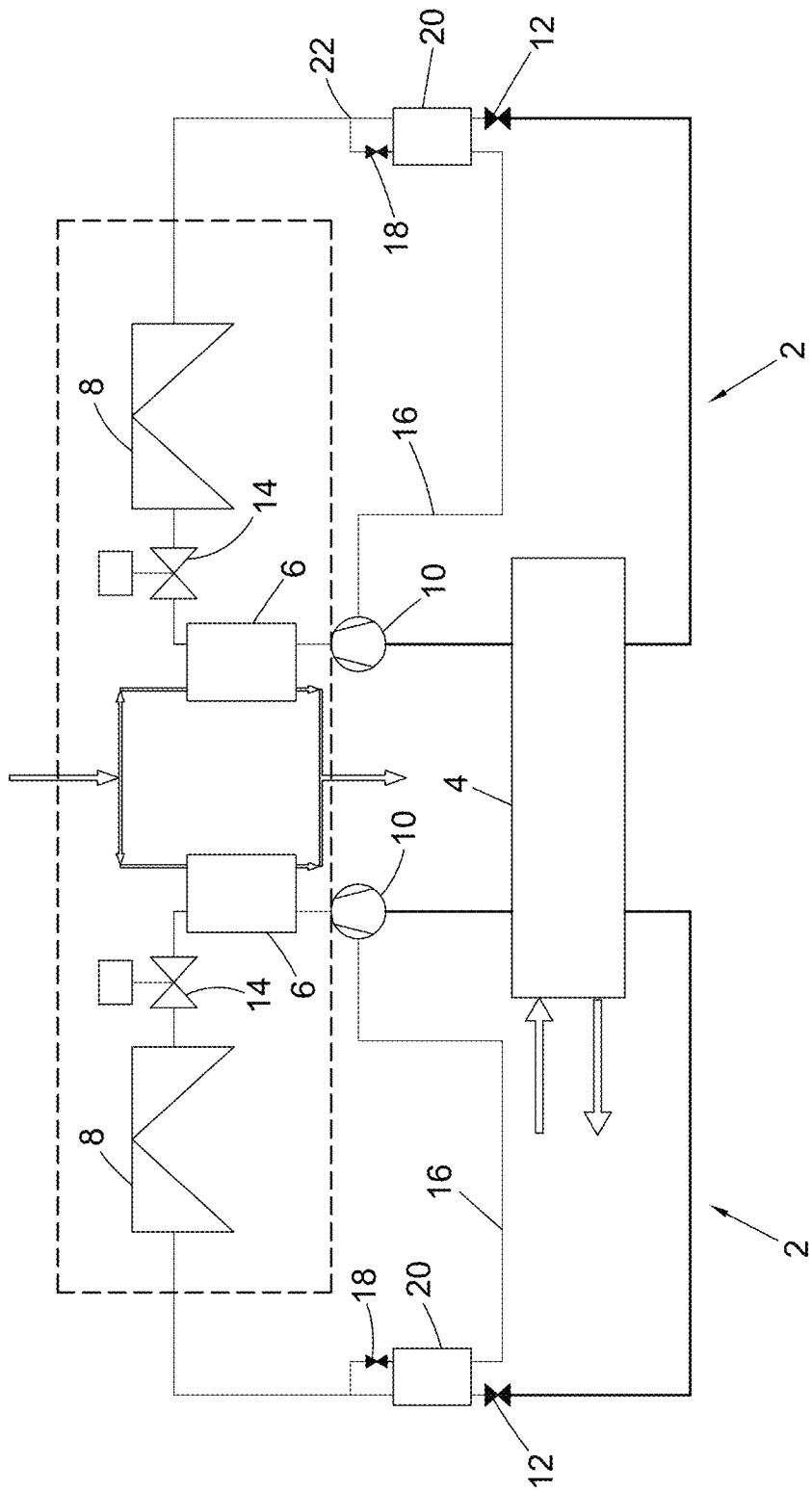
FIG. 1 shows a refrigeration system having two parallel refrigeration circuits.

As shown in FIG. 1 a refrigeration system is arranged for cooling, such as for providing cooling to a temperature controlled space within a building, as well as for heat recovery, such as for heating hot water for the building. The refrigeration system includes first and second refrigeration circuits 2. Both of the refrigeration circuits 2 allow for circulation of a refrigerant fluid that undergoes a refrigeration cycle with compression via compressor 10, and expansion via expansion valve 12, as well as heat exchange as discussed below. Each refrigeration circuit 2 includes a heat absorbing heat exchanger 4 (e.g. an evaporator 4 inside the building) for supplying cooling, and two heat rejecting heat exchangers 6, 8 allowing unwanted heat to be rejected to the atmosphere, i.e. to air at ambient temperature. The heat absorbing heat exchanger 4 may be a single heat exchanger 4 shared between the two circuits 2.

The heat rejecting heat exchangers 6, 8 in each circuit 2 include, in sequence, a first heat rejecting heat exchanger 6 and a second heat rejecting heat exchanger 8, with a controllable valve 14 between the two heat rejecting heat exchangers. The first heat rejecting heat exchanger 6 is a heat recovery heat exchanger for heating water, such as to provide hot water to the building with a set-point of 60° C. It receives compressed refrigerant fluid from the compressor 10 and transfers heat from the refrigerant fluid to the water. A brazed plate heat exchanger 6 can be used. The second heat rejecting heat exchanger 8 is a condenser for further cooling and condensing of the refrigerant fluid. The controllable valve 14 is a motorized valve that is used to increase the effectiveness of the heat recovery by selectively restricting flow of the refrigerant fluid as discussed below.

The heat absorbing heat exchanger 4, which may be an evaporator 4, and may be shared between the two circuits 2 as noted above, receives refrigerant fluid after expansion by the expansion valve 12 and uses heat exchange to absorb heat to evaporate the refrigerant fluid. The heat may be absorbed from air or water within the building, with the cooled air or water being used to cool the temperature controlled space in the building. In the arrangement of FIG. 1 the heat exchanger 4 is arranged for heat exchange with water to be cooled, for example via cooling the water with a set-point of 8° C.

In each of the two refrigeration circuits the heat recovery control valve 14 is used for controlling flow of the compressed refrigerant fluid between the first heat rejecting heat exchanger 6 and the second heat rejecting heat exchanger 8, with the valve 14 having a variable opening and the refrigeration system being arranged to control the size of the variable opening with reference to both of the temperature of the ambient air and the temperature of the second fluid. The opening of the heat recovery control valve 14 is controlled to ensure the required set-point temperature for the hot water. The degree of opening of the heat recovery control valve 14 is reduced in order to allow for increased heat recovery if the temperature of the water is below the set-point temperature. In addition, the degree of opening of the heat recovery control valve 14 is reduced if the ambient air temperature is below a threshold and/or if the difference in temperature between the ambient air and the temperature of the air inside the temperature controlled space exceeds a threshold.

Figure 2:
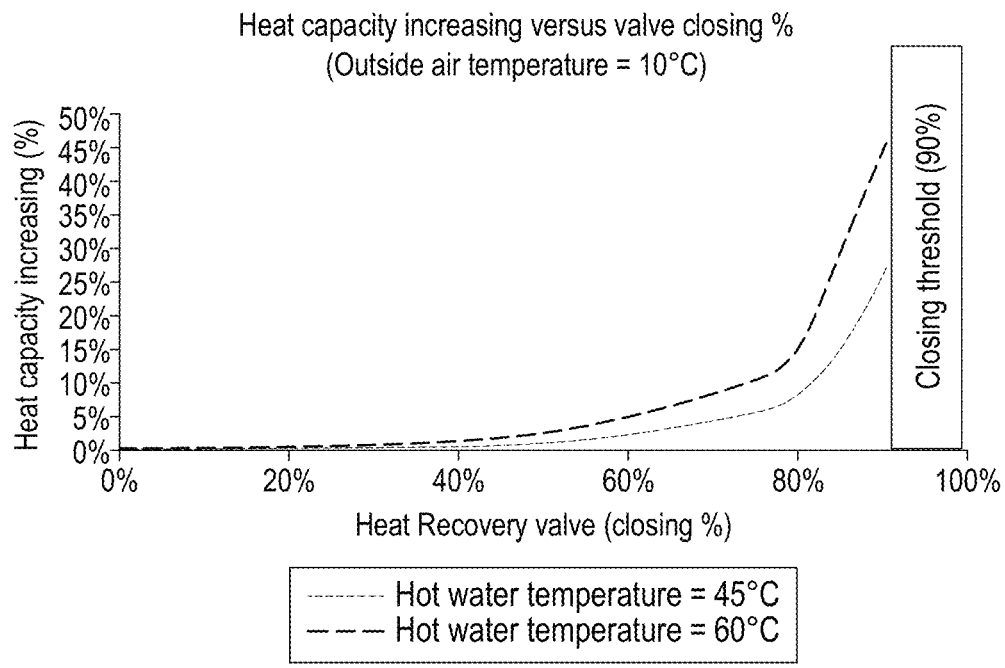
FIG. 2 is a curve plotting heat capacity against the degree of closure of the heat recovery control valve.

FIG. 2 is a plot that illustrates possible gains in heat capacity that may arise from use of the heat recovery control valve. As shown in this Figure it is possible with the example system to increase heat capacity by as much as 45% with a hot water set point of 60° C.

A suitable controller is provided for control of the heat recovery control valve 14 along with other elements within the refrigeration circuit, such as the compressor 10 and expansion valve 12. The controller receives temperature measurements from sensors, such as a sensor for ambient air temperature (outside air temperature), a sensor for temperature of the temperature controlled space, and/or sensors within with refrigeration circuit such as for measuring temperatures and/or pressures.

The expansion valve 12 provides a controllable degree of opening and can be an electronic expansion valve 12. The degree of opening of the expansion valve 12 is controlled to compensate for changes in the behaviour of the refrigerant circuit depending on the degree of opening of the heat recovery control valve 14. Thus, to compensate for a pressure drop generated by the closing of the heat recovery control valve 14, the expansion valve 12 will be controlled to increase its opening in order to keep the same refrigerant mass flow through the circuit.

The control of the heat recovery control valve 12 advantageously incorporates wait times to provide some form of hysteresis. Thus, after activation of a heat recovery mode the controller may allow a first wait time for the hot water to reach the setpoint temperature. If the temperature setpoint for the hot water is not reached with a time period (for example a time in the range 2-10 minutes, such as 5 minutes) after the activation of a heat recovery mode, then the heat recovery control valve 14 will be closed progressively up to a maximum closing degree (for example 90%). Similarly, if the temperature of the hot water drops below the temperature setpoint and remains below the setpoint for a second wait time (which may be the same time period as the first wait time) then the heat recovery control valve 14 is closed progressively. If the heat recovery control valve 14 is part closed then when the hot water temperature setpoint is reached then the valve 14 is opened progressively.

Figure 3:
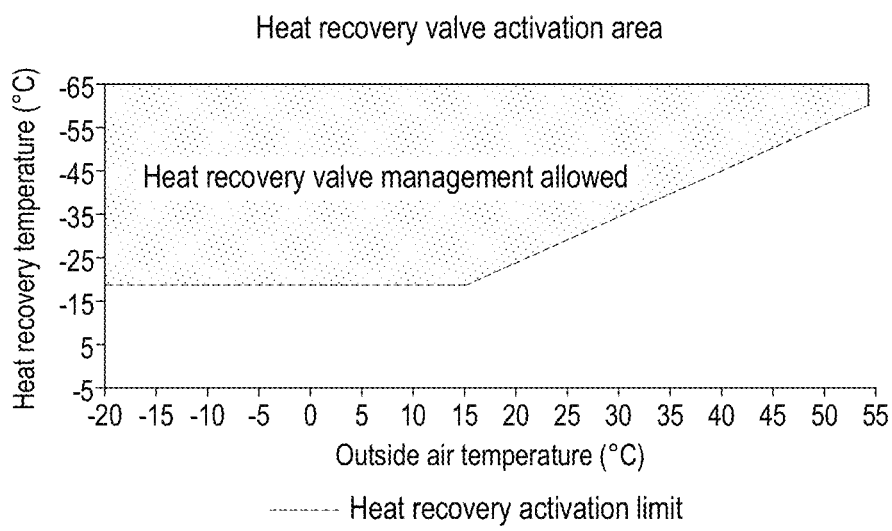
FIG. 3 shows an example of temperature thresholds for use of the heat recovery control valve.

The refrigeration system is arranged to control the size of the variable opening for the heat recovery control valve 14 once the temperature of the refrigerant fluid leaving the first heat rejecting heat exchanger 6 is in excess of a variable threshold value, such as the threshold shown in FIG. 3. In the example of FIG. 3, when the outside air temperature is below a set value, which is 15° C. in this case, then closing of the variable opening of the heat recovery control valve 14 is permitted if the temperature of the refrigerant fluid leaving the first heat rejecting heat exchanger is in excess of the set value, which is 20° C. in this case. When the outside air temperature is above the set value then closing of the variable opening of the heat recovery control valve 14 is permitted if the temperature of the refrigerant fluid leaving the first heat rejecting heat exchanger 6 is in excess of a variable value set by a calculation based on the outside air temperature, such as being in excess of A+(B×outside air temperature), where A and B are constants. In the example of FIG. 3 it will be seen that A=5° C. and B=1.

The tables below show an example for a 30 KAV system using 134A refrigerant.

TABLE 1

| Refrigerant: 134A<br>Air cooled Chiller - Full Load | | Conditions:<br>Full load<br>OAT = 10° C.<br>HR_LWT = 45° C.<br>(No motorized valve) | Conditions:<br>Full load<br>OAT = 10° C.<br>HR_LWT = 45° C.<br>(with motorised valve partially closed) | | |
|---|---|---|---|---|---|
| THERMAL PARAMETERS<br>AIR - OUTDOOR | | | | | |
| OAT | degC. | 11.32 | 10.29 | | |
| HEAT EXCHANGER | | | | | |
| Evaporator Entering Water Temp | degC. | 11.70 | 11.83 | | |
| Evaporator Leaving Water Temp | degC. | 6.96 | 7.00 | | |
| HR Entering Water Temp | degC. | 40.89 | 39.44 | | |
| HR Leaving Water Temp | degC. | 45.13 | 45.02 | | |
| REFRIGERANT PARAMETERS | | | | | |
| Circuit | | CK-A | CK-B | CK-A | CK-B |
| SDT | degC. | 48.89 | 48.84 | 51.81 | 54.87 |
| Discharge Temperature | degC. | 63.68 | 54.67 | 66.36 | 71.60 |
| Inlet_T_Coils | degC. | 47.29 | 46.37 | 23.82 | 28.86 |
| SLT | degC. | 39.65 | 42.97 | 22.48 | 18.34 |
| Liquid Temperature | degC. | 38.93 | 41.46 | 21.83 | 17.13 |
| Subcooling Real | degC. | 0.72 | 1.51 | 0.65 | 1.21 |

TABLE 1-continued

| | | | | | |
|---|---|---|---|---|---|
| SST | degC. | 5.28 | 3.88 | 5.17 | 3.56 |
| Pinch Evap | degC. | 1.67 | 3.08 | 1.84 | 3.45 |
| OVERALL DATA GROSS VALUE | | | | | |
| Cooling Capacity Gross | kW | 484.33 | | 493.49 | |
| Heating Capacity Gross | kW | 379.11 | | 497.99 | |
| Total Input Power Gross | kW | 133.69 | | 132.86 | |
| EER Gross | (—) | 3.62 | | 3.71 | |
| Global efficiency | (—) | 6.46 | | 7.46 | |

In Table 1 the system is at full load. The left hand column shows parameters and data of the system when the motorized valve 14 is not present, or is fully open. The right hand column shows the improvements that arise with the addition of the motorized valve 14 with control to restrict the degree of opening of the motorized valve. It will be seen that this results in a 30% increase in heating capacity as well as a 15% increase in global efficiency.

TABLE 2

| Refrigerant: 134A Air cooled Chiller - Part Load | | Conditions: Part load 50% OAT = 10° C. HR_LWT = 60° C. (No motorized valve) | | Conditions: Part load 50% OAT = 10° C. HR_LWT = 60° C. (with motorized valve partially closed) | |
|---|---|---|---|---|---|
| THERMAL PARAMETERS AIR - OUTDOOR | | | | | |
| OAT | degC. | 12.10 | | 10.30 | |
| HEAT EXCHANGER | | | | | |
| Evaporator Entering Water Temp | degC. | 9.19 | | 8.58 | |
| Evaporator Leaving Water Temp | degC. | 7.01 | | 7.05 | |
| HR Entering Water Temp | degC. | 59.64 | | 58.13 | |
| HR Leaving Water Temp | degC. | 60.11 | | 59.99 | |
| REFRIGERANT PARAMETERS | | | | | |
| Circuit | | CK-A | CK-B | CK-A | CK-B |
| SDT | degC. | 58.06 | 58.98 | 63.29 | 61.95 |
| Discharge Temperature | degC. | 82.74 | 80.48 | 88.31 | 84.35 |
| Inlet_T_Coils | degC. | 57.74 | 58.09 | 24.83 | 21.45 |
| SLT | degC. | 57.47 | 58.41 | 17.00 | 18.52 |
| Liquid Temperature | degC. | 38.53 | 41.50 | 16.59 | 17.68 |
| Subcooling Real | degC. | 18.94 | 16.91 | 0.41 | 0.84 |
| SST | degC. | 5.21 | 5.75 | 6.42 | 6.48 |
| Pinch Evap | degC. | 1.80 | 1.27 | 0.63 | 0.57 |
| OVERALL DATA GROSS VALUE | | | | | |
| Cooling Capacity Gross | kW | 216.84 | | 152.20 | |
| Heating Capacity Gross | kW | 42.93 | | 166.83 | |
| Total Input Power Gross | kW | 86.43 | | 88.36 | |
| EER Gross | (—) | 2.51 | | 1.72 | |
| Global efficiency | (—) | 3.01 | | 3.61 | |

In Table 2 the system is at part load. Once again the left hand column shows parameters and data of the system when the motorized valve 14 is not present, or is fully open, and the right hand column shows the improvements that arise with the addition of the motorized valve 14 with control to restrict the degree of opening of the motorized valve. It will be seen that this results in a 388% increase in heating capacity as well as a 20% increase in global efficiency.

As will be understood from the data in the Tables and an appreciation of operation of the system of FIG. 1, the use of the motorized valve 14 allows for higher saturated discharge temperature (SDT) to increase the heat recovery capacity via the first heat rejection heat exchanger 6, as well as decreased inlet temperature for the second heat rejection heat exchanger 8, which reduces natural convection during heat exchange with the ambient air.

The two refrigeration circuit 2 each also include an economiser line 16. The economiser line 16 extends from a branch in the refrigeration circuit 2 at a branch point 22 after the second heat rejection heat exchanger 8 and prior to the expansion valve 12. The economiser line 16 allows for refrigerant fluid to bypass the heat absorbing heat exchanger 4 and pass to an economiser inlet port of the compressor 10. An economiser valve 18 in economiser line 16 is used for economised expansion and for control of the degree of economiser flow. An economiser heat exchanger 20 is included for heat exchange between refrigerant fluid in the economiser line 16 after the economiser valve 18 and refrigerant fluid in the main line after the branch point 22 and prior to the expansion valve 12. The economiser heat exchanger 20 can be a brazed plate heat exchanger.

What is claimed is:

1. A refrigeration system including at least one refrigeration circuit, the refrigeration circuit comprising:
   a compressor for compressing a refrigerant fluid in the refrigeration circuit;
   a first heat rejecting heat exchanger for receiving the compressed refrigerant fluid and exchanging heat between the compressed refrigerant fluid and a second fluid to increase the temperature of the second fluid;
   a second heat rejecting heat exchanger for receiving the compressed refrigerant fluid and exchanging heat with ambient air to cool the compressed refrigerant fluid;
   an expansion valve for expansion of the refrigerant fluid; and
   a heat absorbing heat exchanger for heat exchange between the expanded refrigerant fluid and a third fluid to decrease the temperature of the third fluid;
   a controller is arranged to receive temperature measurements from sensors, including one or more of a sensor for ambient air temperature, a sensor for temperature of the temperature controlled space, and sensors within the refrigeration circuit;
   wherein the refrigeration circuit further includes a heat recovery control valve for controlling flow of the compressed refrigerant fluid between the first heat rejecting heat exchanger and the second heat rejecting heat exchanger, with the heat recovery control valve having a variable opening and the controller configured to control the size of the variable opening based on at least one of the temperature of the ambient air and the temperature of the second fluid after heat exchange with the refrigerant fluid;
   wherein the controller is configured to control the size of the variable opening of the heat recovery control valve to ensure a required set-point temperature for the second fluid, wherein the controller is configured to reduce a degree of opening of the heat recovery control valve if the temperature of the second fluid is below the set-point temperature;
   wherein the controller is configured to control the size of the variable opening of the heat recovery control valve to increase heat recovery dependent on the temperature of the ambient air, wherein the controller is configured to reduce a degree of opening of the heat recovery control valve if the ambient air temperature is below a threshold and/or if the difference in temperature between the ambient air and the temperature of the air inside the temperature controlled space exceeds a threshold.

2. The refrigeration system as claimed in claim 1, wherein the system is for use in a building, the second fluid is water with the first heat rejecting heat exchanger being for heating the water to provide hot water for the building and the heat exchange with the third fluid is for providing cooling for a temperature controlled space of the building.

3. The refrigeration system as claimed in claim 1, wherein the controller is configured to control the size of the variable opening of the heat recovery control valve, wherein the controller is configured to reduce the size of the variable opening of the heat recovery control valve when the temperature of the second fluid after heat exchange with the refrigerant fluid remains below a set-point temperature.

4. The refrigeration system as claimed in claim 1, wherein the controller is configured to determine that the variable opening of the heat recovery control valve is partly closed and the temperature of the second fluid after heat exchange with the refrigerant fluid is above a set-point temperature for a required time period and control the size of the variable opening to progressively increase the size of the variable opening.

5. The refrigeration system as claimed in claim 1, wherein the heat recovery control valve has a structure that prevents full closure of the valve.

6. The refrigeration system as claimed in claim 1, wherein the expansion valve is arranged to provide a controllable degree of opening and the refrigeration system is arranged to control the degree of opening of the expansion valve to compensate for changes in the behaviour of the refrigerant circuit depending on the degree of opening of the heat recovery control valve.

7. The refrigeration system as claimed in claim 1, wherein the refrigeration circuit comprises an economiser line including an economiser valve in the economiser line for economised expansion and for control of the degree of economiser flow, as well as an economiser heat exchanger for heat exchange between refrigerant fluid in the economiser line after the economiser valve and refrigerant fluid in the main line prior to the expansion valve.

8. The refrigeration system as claimed in claim 7, wherein the refrigeration system is arranged to control the economiser valve to compensate for changes in the behaviour of the refrigerant circuit depending on the degree of opening of the heat recovery control valve.

9. The refrigeration system as claimed in claim 1, wherein the refrigeration circuit is a first refrigeration circuit of the refrigeration system, and the system further includes a second refrigeration circuit; wherein the first and second refrigeration circuits are connected in parallel or in series for heat exchange with the second fluid to heat the second fluid and/or for heat exchange with the third fluid to cool the third fluid.

10. The refrigeration system as claimed in claim 9, wherein the first and second refrigeration circuits are connected in parallel for heat exchange with the second fluid to heat the second fluid and connected in parallel for heat exchange with the third fluid to cool the third fluid.

* * * * *